(12) United States Patent
Stieglbauer et al.

(10) Patent No.: US 7,538,293 B2
(45) Date of Patent: May 26, 2009

(54) SPOT WELDING TOOL FOR RESISTANCE WELDING OF WORKPIECES

(75) Inventors: Walter Stieglbauer, Manning (AT); Gerald Hieslmair, Piberbach (AT)

(73) Assignee: Fronius International GmbH, Pettenbach (AT)

( * ) Notice: Subject to any disclaimer, the term of this patent is extended or adjusted under 35 U.S.C. 154(b) by 62 days.

(21) Appl. No.: 10/543,550

(22) PCT Filed: Jan. 28, 2004

(86) PCT No.: PCT/AT2004/000032

§ 371 (c)(1), (2), (4) Date: Jul. 27, 2005

(87) PCT Pub. No.: WO2004/078404

PCT Pub. Date: Sep. 16, 2004

(65) Prior Publication Data

US 2006/0131281 A1    Jun. 22, 2006

(30) Foreign Application Priority Data

Mar. 4, 2003    (AT)    ................... A 317/2003

(51) Int. Cl.
*B23K 11/30*    (2006.01)
(52) U.S. Cl. .................. 219/119; 219/86.1; 219/90
(58) Field of Classification Search ................ 219/119, 219/86.1, 90, 91.2
See application file for complete search history.

(56) References Cited

U.S. PATENT DOCUMENTS

| | | | | |
|---|---|---|---|---|
| 1,308,778 A | * | 7/1919 | Gravell | ................. 219/82 |
| 2,356,049 A | * | 8/1944 | Goodwin | ................. 219/92 |
| 3,721,796 A | * | 3/1973 | Reed | ................. 219/119 |
| 4,425,073 A | * | 1/1984 | Mattsson | ................. 414/730 |
| 4,652,714 A | * | 3/1987 | Mergey et al. | ................. 219/64 |
| 4,652,715 A | * | 3/1987 | Kitamura et al. | ................. 219/64 |
| 5,334,814 A | * | 8/1994 | Nosetani et al. | ................. 219/119 |
| 5,552,573 A | | 9/1996 | Okita et al. | |
| 5,961,854 A | * | 10/1999 | Mueller et al. | ................. 219/119 |

FOREIGN PATENT DOCUMENTS

| | | | |
|---|---|---|---|
| CH | 466451 | * | 12/1968 |
| DE | 197 54 546 | | 6/1999 |
| EP | 0 830 915 B1 | | 3/1998 |
| JP | 56-151181 | * | 10/1981 |

(Continued)

OTHER PUBLICATIONS

Oikawa H et al: "Resistance Spot Welding of Steel and Aluminum Sheet using Insert Metal," Welding International, Welding Institute, Abington, GB, vol. 13, No. 5, 1999, pp. 349-359, XP000824274, ISSN: 0950-7116.
International Search Report.

*Primary Examiner*—Jessica L Ward
*Assistant Examiner*—Michael Aboagye
(74) *Attorney, Agent, or Firm*—Collard & Roe, P.C.

(57) ABSTRACT

The invention relates to a device for protecting an electrode during the resistance welding of workpieces, in particular sheet metal. Said device comprises a strip that is placed over the electrode and can be displaced in relation to the latter, a backing material of said strip having an electrically conductive coating. To improve the welding quality, the coating is applied to the opposite side of the strip from the electrode and consists of a material, whose hardness is less than that of the backing material of the strip. The soft, electrically conductive coating improves the transfer of current from the electrode to the workpiece, thus preventing weld spatter and improving the welding quality.

3 Claims, 1 Drawing Sheet

FOREIGN PATENT DOCUMENTS

| | | | |
|---|---|---|---|
| JP | 62-040993 | * | 8/1985 |
| JP | 62040993 | * | 8/1985 |
| JP | 61-159288 | | 7/1986 |
| JP | 04-322886 | | 11/1992 |
| JP | 05-192774 | | 8/1993 |
| JP | 05031586 | | 9/1993 |
| JP | 07051865 | | 2/1995 |
| JP | 08-118037 | | 5/1996 |
| JP | 10-029071 | | 2/1998 |
| JP | 2002-045974 | | 2/2002 |

* cited by examiner

SPOT WELDING TOOL FOR RESISTANCE WELDING OF WORKPIECES

CROSS REFERENCE TO RELATED APPLICATIONS

Applicants claim priority under 35 U.S.C. §119 of Austrian Application No. A 317/2003, filed Mar. 4, 2003. Applicants also claim priority under 35 U.S.C. §365 of PCT/AT2004/000032 filed Jan. 28, 2004. The international application under PCT article 21(2) was not published in English.

BACKGROUND OF THE INVENTION

The invention relates to a device for the protection of an electrode during the resistance welding of workpieces, particularly metal sheets, including a strip placed over the electrode, preferably in a manner displaceable relative to the same, wherein a carrier material of the strip is provided with an electrically conductive coating.

At present, metal sheets or other workpieces made of aluminum alloys and magnesium as well as galvanized or coated steel sheets—partially in high-strength quality—are used to an increasing extent, for instance, in body-making. Apart from advantages like weight saving and good corrosion resistance, those materials or their coatings cause problems during joining by resistance spot-welding. Above all, the tool life quantity of the spot-welding electrodes employed, which is strongly reduced relative to that of blank steel sheets, has negative effects. The high wear of the electrodes involves high costs, requiring frequent reworking of the electrode contact surfaces and frequent electrode exchanges resulting therefrom, as well as a reduced welding quality, particularly prior to an electrode reworking process or an electrode exchange.

To protect spot-welding electrodes from contamination or electrode pick-up by the material to be welded, it is known to insert a metal film in strip-form between the electrode and the workpiece. In order to ensure safe strip feeding, it is necessary to prevent the strip from adhering to the electrode contact surface.

In this respect, a device for the protection of electrodes during spot-welding is known from EP 0 830 915 B1, in which a strip is drawn by the aid of an unwinding mechanism over the electrode to be protected. The strip consists essentially of a copper-nickel alloy, or pure nickel, and has a thickness of 0.02 to 0.05 mm. In order to ensure an extended tool life quantity, the electrode and, in particular, the electrode cap is coated with silver, or a silver metal-oxide, or provided with an appropriate insert.

Furthermore, a strip for the protection of an electrode in a resistance welding process is known from U.S. Pat. No. 5,552,573 A, which strip is comprised of a base material coated on either side. The layers may be comprised of the same or of different materials. The base material has a thickness of 0.02 to 1 mm and is comprised of iron, steel, copper or a copper alloy. The applied layers have thicknesses ranging from 1 to 100 μm and may be comprised of nickel, titanium, niobium, molybdenum, tungsten, chromium, cobalt or alloys thereof. Such strips have the drawback of involving extremely high production demands due to coating or alloying and, hence, extremely high production costs. Another very important disadvantage resides in that a plurality of combinations of the most different materials may be envisaged so that a demanding and expensive storage of such combination strips for the most different applications will be required, since users will not be able to compose the different combinations on their own.

Applications of strips for the protection of electrodes in spot-welding methods are further known from DE 197 54 546 C1, JP 10-029071 A, JP 08-118037 A, JP 04-322886 A or JP 05-192774 A. There, the strips, which are supplied and discharged via winding mechanisms, are positioned above the electrodes in the spot-welding tools. The strip will, thus, come to lie on the workpiece during a spot-welding process, and the electrode will, thus, be protected from contacting the workpiece.

In the methods according to DE 197 54 546 C1 and JP 04-322886 A, it is disadvantageous that the protective strip is drawn over the electrode during conveyance, thus causing a high wear of the electrode on account of the friction occurring between the electrode and the strip.

The methods according to JP 10-029071 A and JP 08-118037 A involve the disadvantage of requiring a highly complex structure for the conveyance of the strip and, in particular, its supply and discharge, so that spot-welding tools of this kind are hardly usable in practice. By such apparatus it is, in fact, only feasible to weld together simple metal sheets. Their application in spot-welding tongs for robots, particularly in the automotive industry, is not possible because this would require small and compact spot-welding tools. JP 07-051865 A describes a protective strip for electrodes in the resistance welding of workpieces, which strip is comprised of a carrier material having an electrically conductive coating arranged on either side. The carrier material consists of copper, while the electrically conductive coating is made of graphite particles. The coating of the copper foil with the graphite particles serves to render the alloying reaction between the workpiece and the electrodes, and the workpiece and the electrode protection layer, more difficult. The manufacture of such a strip is, however, relatively demanding.

SUMMARY OF THE INVENTION

The invention is based on the object to provide a device for the protection of an electrode, by which the welding quality is substantially improved.

The object of the invention is achieved in that said coating is arranged on the strip side facing away from the electrode and is comprised of a material which has a lower hardness than the carrier material of the strip. This offers the advantage that, on account of the soft coating material, the latter is pressed into the ripped oxide layer of the workpieces to be welded, due to the pressure exerted by the electrode and the welding tongs prior to the welding process, whereby an enhanced current transfer and a reduced electric resistance will be ensured. The thermal action on the contact surface of the strip to the workpiece will, thus, be substantially reduced at the beginning of spot-welding, and weld spatters will, thus, be avoided. The soft coating of the protective strip in the first place has beneficial effects on aluminum materials, yet these are similar with other materials too. A further advantage consists in that the safety of the welding process is extremely increased, and welding defects are strongly reduced, due to the substantially enhanced current transfer. Cost-intensive reworking operations may, thus, be avoided or reduced.

The coating of the strip or carrier material may, for instance, be comprised of tin or zinc, or a tin or zinc alloy.

In a preferred manner, the strip is comprised of what is called tinplate, with the carrier material being made of steel and the coating consisting of tin.

It is feasible to provide at least two superimposed strips, wherein the strip that comes into contact with the workpiece, particularly metal sheet, has the coating, which is of a smaller height than the carrier material of said strip, on its side facing the workpiece, particularly metal sheet. Besides two superimposed strips, it is also feasible to apply several superimposed strips.

According to another characteristic feature of the invention it is provided that the material of said carrier material of the strip facing the electrode is selected from the group of ferrous metals, or an alloy having its main component from the group of ferrous metals, or copper or a copper alloy. Due to the relatively low melting temperature, the material is caused to completely evaporate during the welding process, thus exerting no influence on the surface of the workpiece.

According to another characteristic feature of the invention, it is provided that the strip coating facing the workpiece, particularly metal sheet, is comprised of a material having a melting temperature of below 1000 ° C.

BRIEF DESCRIPTION OF THE DRAWINGS

In the following, the invention will be explained in more detail by way of exemplary embodiments.

FIGS. 1 and 2 illustrate strips 1 for the protection of electrodes 2 during resistance welding.

DETAILED DESCRIPTION OF THE PREFERRED EMBODIMENTS

Figure 1:
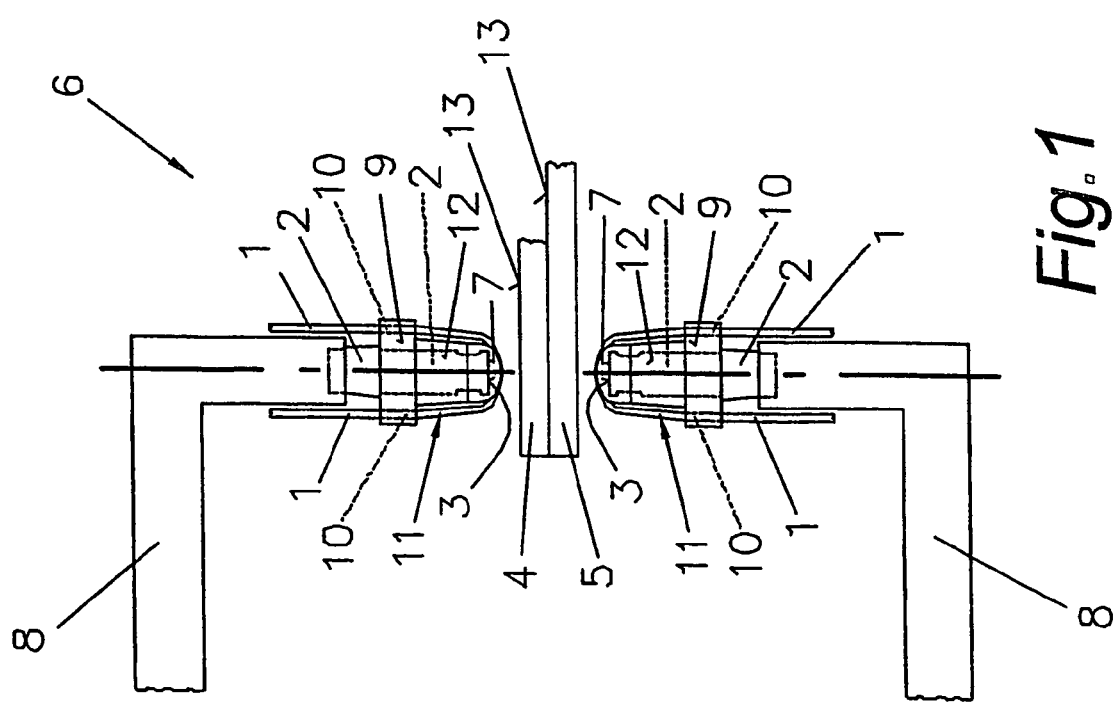
FIG. 1 is a schematic side view of an embodiment of a spot welding tool.

Such strips 1 for the protection of electrodes 2, which are preferably made of copper or a copper alloy, in practice are arranged between the electrode 2, particularly an electrode cap 3, and the surface of the workpieces to be welded, particularly metal sheets 4, 5, in a manner displaceable relative to the electrode 2 as is schematically illustrated in FIG. 1. The latter shows a spot welding tool 6 used for the resistance welding of metal sheets 4, 5 or structural components. In a preferred manner, the spot-welding tool 6 is used in combination with a winding mechanism (not illustrated) for winding and unwinding the strip 1 transversely contacting the electrode 2. For the protection of; the electrode 2, it is, however, also possible to use a two- or multi-component strip 1 optionally including an alloyed-on layer.

Furthermore, a pressure element 7 may be movably arranged about the electrode 2 in the region of the electrode cap 3, or a contact surface of the electrode 2 with the metal sheet 4 or 5, respectively. Such a pressure element 7 will exert additional pressure on the workpieces, particularly metal sheets 4, 5. When using the spot-welding tool 6 with a strip 1, the pressure element 7 preferably comprises a guide for the strip 1, particularly on its end face. The pressure element 7 may be configured to lift the strip 1 off the electrode 2 in a manner that the strip 1 may be lifted off the surface of the electrode 2 or electrode cap 3 during or after the opening of welding tongs 8 or a functionally similar apparatus. The guide provided in the pressure element 7 is designed such that the strip 1 terminates level with an end face of the pressure element 7. The guide provided for the strip 1 within the pressure element 7 may, of course, also be designed such that the strip 1 projects beyond the end face of the pressure element 7. In the relieved state, i.e., with the welding tongs 8 opened, the pressure element 7 projects beyond the electrode 2 and, hence, keeps the strip 1 at a distance from the electrode 2.

Furthermore, a supporting element 9 comprising guide channels 10 for the reception of the strip 1 may be arranged on the electrode 2. A means 11 for the application of force on the pressure element 7 and, in particular, a spring element may be arranged between the supporting element 9 and the pressure element 7, thus enabling a suitable pressure to be exerted on the pressure element 7 so as to displace the same along the electrode 2.

In the example illustrated, the pressure element 7, or strip guide, is pressed forward by an elastomer spring 12. The pressure element 7 may, of course, also be actuated in any other way, e.g., pneumatically, hydraulically or electrically. The pressure element 7 will, thus, exert a high pressure or a large force on the workpiece, particularly metal sheet 4, 5, if it is pressed against the workpiece, particularly metal sheet 4, 5, upon actuation of the welding tongs 8. When the welding tongs 8 are closed, the pressure element 7 is pressed back after having touched the workpiece, particularly metal sheet 4, 5, until the electrode 2, or electrode cap 3, contacts the metal-sheet surfaces 13 of the metal sheets 4, 5 via the strip 1. When the welding tongs 8 are opened, the pressure element 7 is pressed forward by means 11 for the application of force and, in particular, an elastomer spring 12 or any other actuating means. Because of the deliberately produced tensile stress and the unavoidable stiffness of the strip 1, the latter is forcibly placed in spaced-apart relationship to the surface of the electrode 2 and, in particular, the electrode cap 3.

The pressure element 7 during the welding process, thus, partially presses on the sheet-metal surface 13 lying close to the welding zone and thereby prevents the two workpieces, particularly metal sheets 4, 5, from being opened, which will usually happen during spot-welding, by additionally supplying pressure to the electrode 2.

The strip 1, or a carrier material 14 of the strip 1, on the side facing away from the electrode 2 is coated with an electrically well conducting, soft material, wherein the material of the coating 15 has a lower hardness than the carrier material of the strip 1. The coating 15 of the strip 1 may be comprised of tin or zinc or a tin or zinc alloy, preferably having a melting temperature of below 1000 ° C. In a preferred manner, the strip 1 is made of tinplate, i.e., steel with a tin plating.

It goes without saying that the coating 15 may likewise be used with a strip 1 comprised of at least two parts or layers, i.e., two superimposed strips 1. In the event of a two-part strip 1, the strip 1 or layer that comes into contact with the workpiece or metal sheet 4, 5 is provided with the electrically well conducting, soft material, i.e. the coating 15, and that coating 15 comes into contact with the workpiece or metal sheet 4, 5. The material of the strip layer facing the electrode 2 may be selected from the group of ferrous metals, or an alloy having its main component from the group of ferrous metals, or copper or a copper alloy, or steel or a steel alloy.

During the resistance welding of, for instance, aluminum elements or aluminum sheets 4, 5, problems will arise because of the insulating oxide layer of the elements or metal sheets 4, 5. The oxide layer is, in fact, very brittle and has an electrically insulating effect. Yet, by providing the perfectly electrically conducting, soft coating 15 of the strip 1, it will be ensured that, due to the pressure exerted by the welding tongs 8, the oxide layer of the metal sheet 4, 5 will be broken or ripped and the soft layer 15, or material of the layer 15, will be pressed into the gaps of the oxide layer, thus providing a perfect current transfer, i.e., a smaller resistance and a larger current entry surface.

Due to the improved contact with the base material of the metal sheets 4, 5, a substantially reduced heat introduction is caused on the contact surfaces of the strip 1 with the metal sheets 4, 5 on account of the reduced electrical resistance and the enlarged current entry surface at the beginning of welding, i.e., during the powering with energy, whereby surface spatters will be avoided.

In principle, it can, thus, be said that by using an electrically well conducting, soft material for the coating 15 of the strip 1 it will be ensured that the material of the coating 15 will mix with the material of the metal sheets 4, 5 under the action of pressure so as to achieve a substantially improved welding quality by the prevention of weld spatter. The use of such a strip 1 with the respective coating 15 is not only advantageous in the welding of metal sheets 4, 5 made of aluminum.

Figure 3:
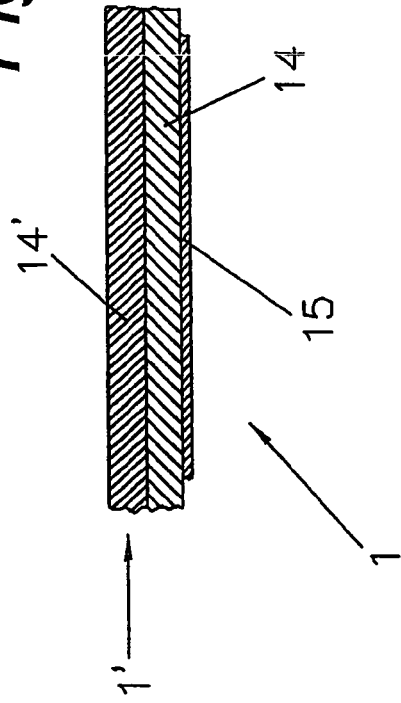
FIG. 3 illustrates a section through another embodiment of an electrode protection device comprising two superimposed strips.
Figure 2:
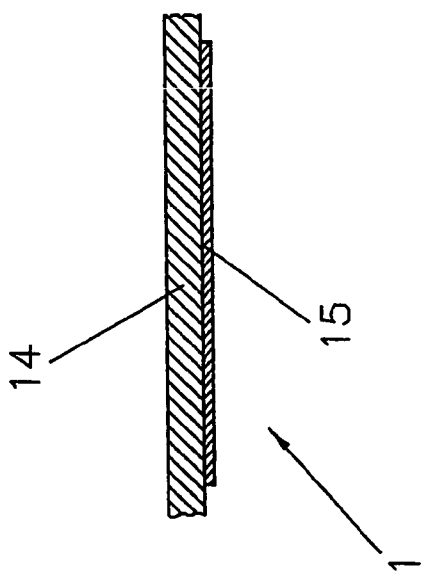
FIG. 2 shows a section through the strip for the protection of an electrode in a simplified, schematic illustration.

FIG. 3 illustrates a section through an embodiment of an electrode protection device in which two strips 1, 1' are arranged one above the other, wherein the strip 1 that comes into contact with the workpiece, particularly metal sheet 4, 5, has the coating 15, which is of a lower hardness than the carrier material 14 of the strip 1, on its side facing the workpiece, particularly metal sheet 4, 5. Moreover, the height of the coating 15 is smaller than that of the carrier material 14 of the strip 1. The second strip 1' merely comprises a carrier material 14' without coating. It is, of course, also feasible to arrange several strips, even of different thicknesses, one above the other.

The invention claimed is:

1. A spot-welding tool for resistance welding of workpieces made of aluminum and having a brittle oxide layer, comprising:

at least one welding tong;

an electrode disposed on said at least one welding tong; and a strip (1) placed over the electrode (2), in a manner displaceable relative to the electrode, a pressure element movably arranged on the electrode in a region of an electrode cap, said pressure element being adapted to lift the strip off of the electrode during or after opening of the welding tongs and said pressure element being displaced relative to the electrode via a force application means when the welding tong is opened;

wherein a carrier material (14) of the strip (1) is made of steel and is provided with an electrically conductive coating (15), wherein said coating (15) is arranged on the strip side facing away from the electrode (2) and is comprised of tin, and wherein said tool is structured such that during welding, pressure from said at least one welding tong breaks the oxide layer of said workpiece, and said coating is pressed into gaps of the oxide layer of the workpiece.

2. A spot-welding tool according to claim 1, wherein at least two superimposed strips (1, 1') are provided, wherein the strip (1) that comes into contact with the workpiece has the coating (15), which is of a smaller height than the carrier material (14) of said strip, on its side facing the workpiece.

3. The spot welding tool according to claim 1, wherein the force application means is an elastomer spring.

* * * * *